US007801436B2

(12) United States Patent
Kobayashi

(10) Patent No.: US 7,801,436 B2
(45) Date of Patent: Sep. 21, 2010

(54) PHOTOGRAPHY APPARATUS, PHOTOGRAPHY METHOD, AND PHOTOGRAPHY PROGRAM

(75) Inventor: Koji Kobayashi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 824 days.

(21) Appl. No.: 11/705,777

(22) Filed: Feb. 14, 2007

(65) Prior Publication Data
US 2007/0189752 A1  Aug. 16, 2007

(30) Foreign Application Priority Data
Feb. 15, 2006  (JP) .............................. 2006-037359

(51) Int. Cl.
G03B 15/03 (2006.01)
H04N 5/228 (2006.01)
H04N 9/73 (2006.01)
G06K 9/00 (2006.01)

(52) U.S. Cl. .................. 396/157; 348/222.1; 348/223.1; 382/167

(58) Field of Classification Search .................. 396/157
See application file for complete search history.

(56) References Cited
U.S. PATENT DOCUMENTS
7,298,412 B2  11/2007  Sannoh et al. ............... 348/348

| 2007/0110305 | A1* | 5/2007 | Corcoran et al. | 382/167 |
| 2007/0177050 | A1* | 8/2007 | Xiao et al. | 348/371 |
| 2007/0195171 | A1* | 8/2007 | Xiao et al. | 348/207.99 |
| 2008/0122944 | A1* | 5/2008 | Zhang | 348/222.1 |
| 2010/0020191 | A1* | 1/2010 | Sugimoto | 348/222.1 |
| 2010/0026836 | A1* | 2/2010 | Sugimoto | 348/223.1 |

FOREIGN PATENT DOCUMENTS

| JP | 2001-339636 A | 12/2001 |
| JP | 2003-107555 A | 4/2003 |
| JP | 2003-107567 A | 4/2003 |
| JP | 2003-143524 A | 5/2003 |
| JP | 2004-320284 A | 11/2004 |
| JP | 2006-033519 A | 2/2006 |

* cited by examiner

Primary Examiner—Melissa J Koval
(74) Attorney, Agent, or Firm—Birch, Stewart, Kolasch & Birch, LLP

(57) ABSTRACT

In order to prevent white compression from occurring in an image obtained by photography with a photography apparatus such as a digital camera, preliminary photography is carried out and actual photography is carried out while a flash control unit reduces an amount of light from a flash in the case where a predetermined target such as a human face is included in a preliminary image. Image processing is carried out on an actual image obtained through the actual photography for adjusting luminance and/or gradation of the predetermined target in the actual image.

8 Claims, 7 Drawing Sheets

PHOTOGRAPHY APPARATUS, PHOTOGRAPHY METHOD, AND PHOTOGRAPHY PROGRAM

BACKGROUND OF THE INVENTION

1. Field of the Invention

The present invention relates to a photography apparatus such as a digital camera that obtains an image by photography and to a photography method. The present invention also relates to a program that causes a computer to execute the photography method.

2. Description of the Related Art

A digital camera having a function for adjusting an amount of flash upon photography has been proposed (Japanese Unexamined Patent Publication No. 2004-320284). In the case where an outline of a face is extracted from an image wherein a subject looks dark in photography with the digital camera, the distance to the subject is calculated based on the size of the face, the distance between the eyes, and the position of a zoom lens. If the distance to the subject is within a distance of a proper exposure range, preliminary flash emission is carried out before photography. Based on the light reflected by the face at this time, the amount of flash is adjusted for photography.

However, in the digital camera described above, white compression causing the face to look too whitish may occur if adjustment of the flash amount is not successful. Since white compression in an image cannot be corrected by subsequent image processing, photography needs to be carried out again.

SUMMARY OF THE INVENTION

The present invention has been conceived based on consideration of the circumstances described above. An object of the present invention is therefore to prevent white compression in an image obtained by photography with a photography apparatus such as a digital camera.

A first photography apparatus of the present invention comprises:

photography means for obtaining an image representing a subject by photographing the subject and comprising imaging means for imaging the subject;

illumination means for emitting an auxiliary light to the subject at the time of photography of the subject;

processing control means for obtaining an actual image by carrying out actual photography of the subject with the photography means while reducing an amount of the auxiliary light in the case where a predetermined target has been detected in a preliminary image obtained by causing the photography means to carry out preliminary photography; and image processing means for adjusting luminance and/or gradation of a region of the predetermined target in the actual image.

A second photography apparatus of the present invention comprises:

photography means for obtaining an image representing a subject by photographing the subject and comprising imaging means for imaging the subject;

illumination means for emitting an auxiliary light to the subject at the time of photography of the subject;

processing control means for obtaining an actual image by carrying out actual photography of the subject with the photography means while lowering a gain of the imaging means in the case where a predetermined target has been detected in a preliminary image obtained by causing the photography means to carry out preliminary photography; and image processing means for adjusting luminance and/or gradation of a region of the predetermined target in the actual image.

Adjusting the luminance refers to adjusting the luminance of the entire actual image or a part corresponding to the predetermined target so as to cause the predetermined target in the actual image, which becomes dark by the photography while reducing the amount of the auxiliary light or lowering the gain of the imaging means, to become lighter. More specifically, the luminance is adjusted so as to cause an average of the luminance of the predetermined target to become a predetermined value.

Adjusting the gradation refers to adjusting the gradation of the entire actual image or the part corresponding to the predetermined target so as to cause the predetermined target in the actual image, which becomes dark by the photography while reducing the amount of the auxiliary light or lowering the gain of the imaging means, to become lighter. More specifically, the gradation is adjusted so as to cause the average of the luminance of the predetermined target to become the predetermined value.

In the first and second photography apparatuses of the present invention, it is preferable for the predetermined target to be a human face.

A first photography method of the present invention is a photography method for a photography apparatus. The photography apparatus comprises:

photography means for obtaining an image representing a subject by photographing the subject and comprising imaging means for imaging the subject; and illumination means for emitting an auxiliary light to the subject at the time of photography of the subject. The first photography method comprises the steps of:

detecting a predetermined target in a preliminary image obtained by causing the photography means to carry out preliminary photography;

obtaining an actual image by carrying out actual photography of the subject with the photography means while reducing an amount of the auxiliary light in the case where the predetermined target has been detected in the preliminary image; and adjusting luminance and/or gradation of a region of the predetermined target in the actual image.

A second photography method of the present invention is a photography method for a photography apparatus. The photography apparatus comprises:

photography means for obtaining an image representing a subject by photographing the subject and comprising imaging means for imaging the subject; and illumination means for emitting an auxiliary light to the subject at the time of photography of the subject. The second photography method comprises the steps of:

detecting a predetermined target in a preliminary image obtained by causing the photography means to carry out preliminary photography;

obtaining an actual image by carrying out actual photography of the subject with the photography means while lowering a gain of the imaging means in the case where the predetermined target has been detected in the preliminary image; and adjusting luminance and/or gradation of a region of the predetermined target in the actual image.

The first and second photography methods of the present invention may be provided as programs that cause a computer to execute the methods.

According to the first photography apparatus and the first photography method of the present invention, in the case where the predetermined target has been detected in the preliminary image, the actual image is obtained by actual photography of the subject with the photography means while reducing the amount of auxiliary light. The luminance and/or gradation of the predetermined target in the actual image is/are then adjusted. By reducing the amount of the auxiliary light, white compression of the predetermined target can be prevented in the actual image obtained through the actual photography. In addition, by adjusting the luminance and/or gradation of the region of the predetermined target, the predetermined target can be prevented from becoming dark although the target becomes dark in the actual image by reduction in the amount of the auxiliary light.

According to the second photography apparatus and the second photography method of the present invention, in the case where the predetermined target has been detected in the preliminary image, the actual image is obtained by actual photography of the subject while lowering the gain of the imaging means. The luminance and/or gradation of the predetermined target in the actual image is/are then adjusted. By lowering the gain of the imaging means, white compression of the predetermined target can be prevented in the actual image obtained through the actual photography. In addition, by adjusting the luminance and/or gradation of the region of the predetermined target, the predetermined target can be prevented from becoming dark although the target becomes dark in the actual image by lowering the gain of the imaging means.

DESCRIPTION OF THE PREFERRED EMBODIMENTS

Figure 1:
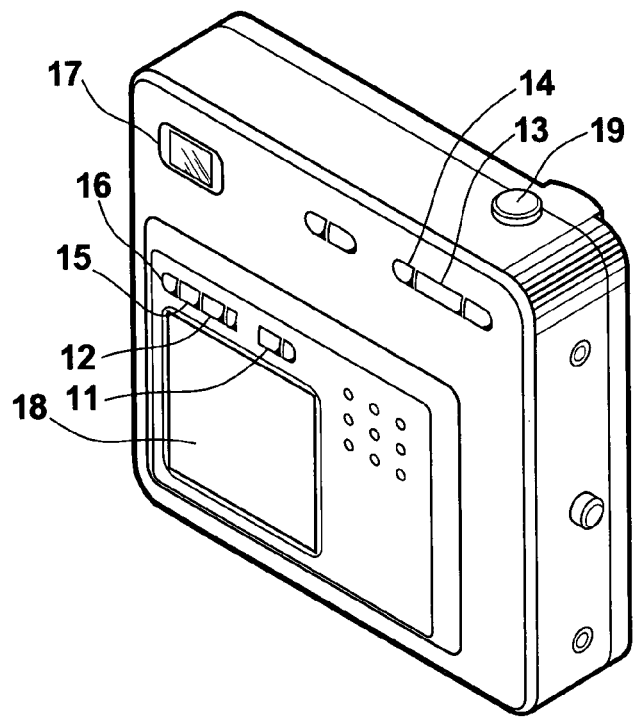
FIG. 1 is an oblique view around the rear of a digital camera as a first embodiment of a photography apparatus of the present invention.
Figure 2:
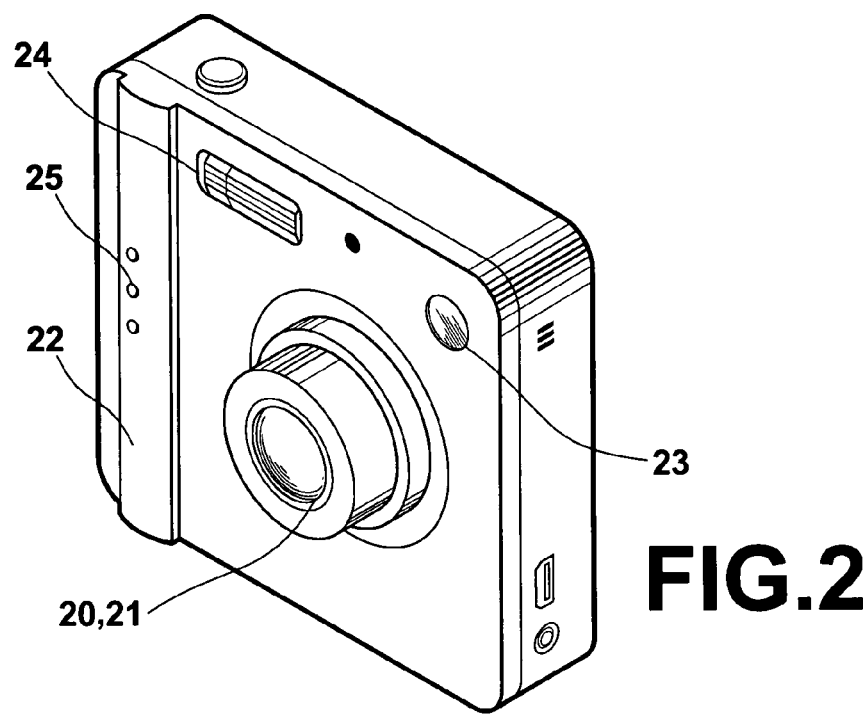
FIG. 2 is an oblique view around the front of the digital camera in the first embodiment of the present invention.

Hereinafter, embodiments of the present invention are described with reference to the accompanying drawings. FIG. 1 is an oblique view around the rear of a digital camera 1 as a first embodiment of a photography apparatus of the present invention. As shown in FIG. 1, the digital camera 1 has an operation mode switch 11, a menu/OK button 12, a zoom/up-down lever 13, right-left buttons 14, a Back button 15, and a display switching button 16, all of which serve as interfaces for operation by a photographer and are located at the rear thereof. In addition, the digital camera 1 has a viewfinder 17 and a liquid crystal display (LCD) monitor 18 at the rear thereof and a release button 19 on the upper side thereof. FIG. 2 is an oblique view around the front of the digital camera 1 in the first embodiment. As shown in FIG. 2, the digital camera 1 has a lens 20, a lens cover 21, a power switch 22, a viewfinder window 23, a flash 24, and a self-timer lamp 25 located on the front thereof.

The operation mode switch 11 is a slide switch for changing operation mode between still image photography mode, moving image photography mode, and playback mode.

By pressing the menu/OK button 12, various kinds of menus are displayed on the LCD monitor 18 for setting a photography mode, a flash emission mode, the number of pixels to be recorded, and sensitivity, for example. The menu/OK button is also used for confirming the setting or selection based on the menus displayed on the LCD monitor 18. By using the menu/OK button 12, the photography mode can be set to automatic mode or manual mode wherein exposure and white balance are set automatically or manually, respectively.

When the zoom/up-down lever 13 is slid up or down during photography, zooming of the camera can be adjusted for tele-zoom or wide-zoom. When the lever 13 is slid up or down at the time of setting, a cursor in a menu screen displayed on the LCD monitor 18 can be moved up or down.

The right-left buttons 14 are used for moving the cursor to the right and to the left in a menu screen displayed on the LCD monitor 18 at the time of setting.

Pressing the Back button 15 stops a setting operation to display an immediately preceding screen.

By pressing the display switching button 16, the LCD monitor 18 and display of various guides and characters thereon can be turned on and off.

The content set by operation of the buttons and the zoom/up-down lever can be confirmed by display on the LCD monitor 18, a lamp in the viewfinder, and a position of the zoom/up-down lever, for example.

The LCD monitor 18 functions as an electronic viewfinder by displaying a through image for confirmation of a subject at the time of photography. The LCD monitor also displays a still image or a moving image played back after photography, in addition to the various kinds of menus.

Figure 3:
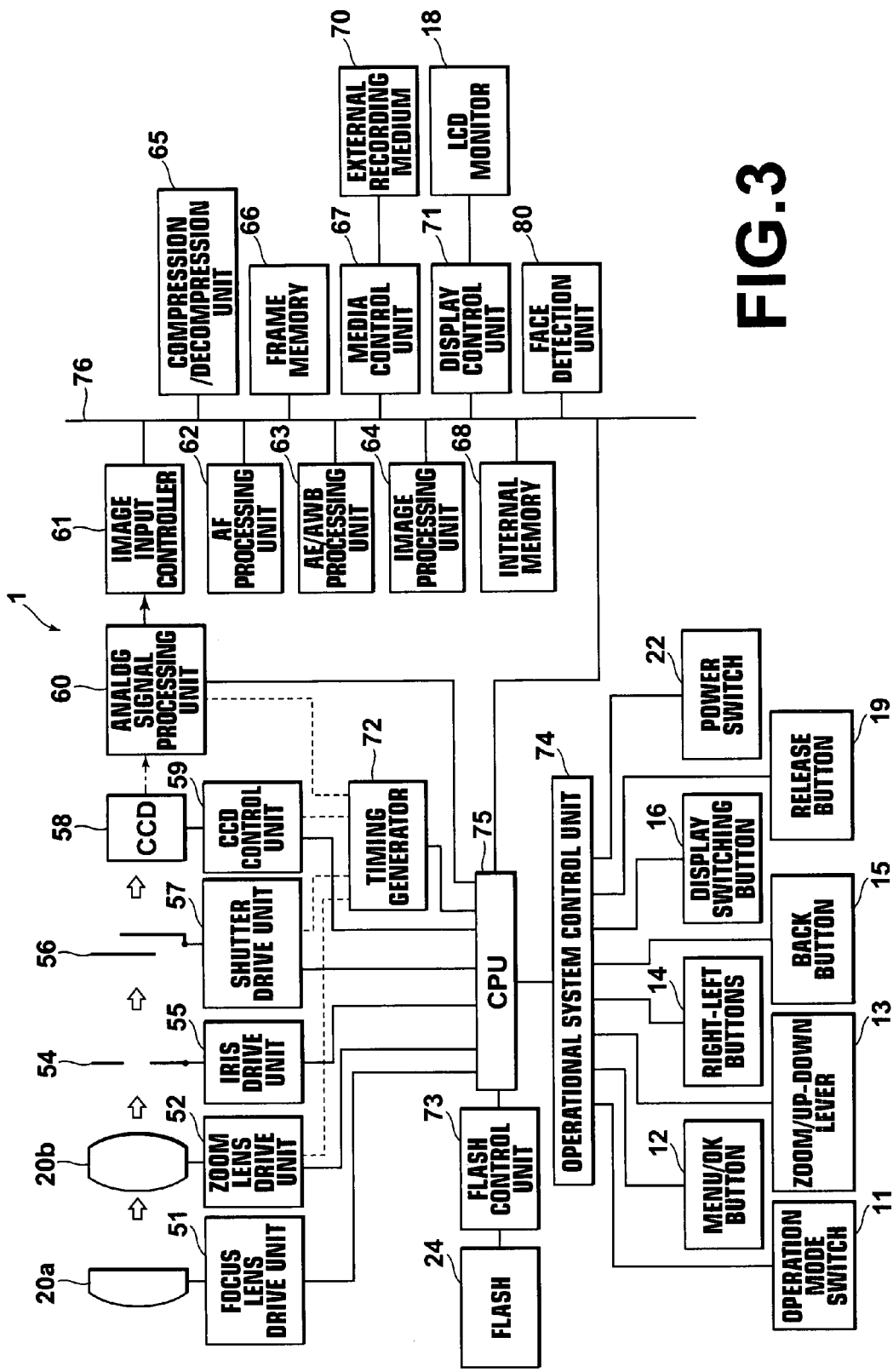
FIG. 3 is a block diagram showing the configuration of the digital camera in the first embodiment of the present invention.

FIG. 3 is a block diagram showing the configuration of the digital camera 1 as the first embodiment of the present invention. As shown in FIG. 3, the digital camera 1 converts image data obtained by photography into an image file of Exif format, and records the file in an external recording medium 70 that can be attached to and detached from the camera.

The digital camera 1 has an operational system including the operation mode switch 11, the menu/OK button 12, the zoom/up-down lever 13, the right-left buttons 14, the Back button 15, the display switching button 16, the release button 19, and the power switch 22 described above, in addition to an operational system control unit 74 as an interface for sending how the operational system is being operated to a CPU 75.

The digital camera 1 also has a focus lens 20a and a zoom lens 20b as an optical system. The lenses can be moved along an optical axis by a focus lens drive unit 51 and a zoom lens drive unit 52 each comprising a motor and a motor driver. The focus lens drive unit 51 and the zoom lens drive unit 52 control movement of the corresponding lenses based on focus drive data output from an AF processing unit 62 and on data representing operation of the zoom/up-down lever 13, respectively.

An iris 54 is driven by an iris drive unit 55 comprising a motor and a motor driver. The iris drive unit 55 adjusts a diameter of the iris based on iris-value data output from an AE/AWB processing unit 63.

A shutter 56 is a mechanical shutter and driven by a shutter drive unit 57 comprising a motor and a motor driver. The shutter drive unit 57 opens and closes the shutter 56 according to a signal generated by pressing down the release button 19 and according to shutter speed data output from the AE/AWB processing unit 63.

A CCD 58 as an imaging device is located at the rear of the optical system. The CCD 58 has a photoelectric surface whereon a plurality of light receiving devices are arranged two-dimensionally. A light from the subject passing through the optical system forms an image on the surface and is subjected to photoelectric conversion. In front of the photoelectric surface are located a micro-lens array for focusing the light on each pixel and a color filter array wherein filters for R, G, and B colors are arranged regularly. The CCD 58 outputs an electric charge stored at each of the pixels as a serial analog photography signal for each line while synchronizing with a vertical transfer clock signal and a horizontal transfer clock signal supplied from a CCD control unit 59. The time during which the electric charge is stored at each of the pixels, that is, an exposure time is determined by an electronic shutter drive signal output from the CCD control unit 59. A gain of the CCD 58 is adjusted by the CCD control unit 59 so as to obtain the analog photography signal of a predetermined magnitude.

The analog photography signal from the CCD 58 is input to an analog signal processing unit 60. The analog signal processing unit 60 comprises a correlated double sampling (CDS) circuit for removing noise from the analog signal, an automatic gain controller (AGC) for adjusting a gain of the analog signal, and an A/D converter (ADC) for converting the analog signal into a digital signal. The image data converted into the digital signal are CCD-RAW data having density values of R, G, and B colors for each of the pixels.

A timing generator 72 generates a timing signal. Feeding of the timing signal to the shutter drive unit 57, the CCD control unit 58, and the analog signal processing unit 60 synchronizes operation of the release button 19, the opening/closing of the shutter 56, input of the electric charge of the CCD 58, and processing by the analog signal processing unit 60.

A flash control unit 73 causes the flash 24 to flash at the time of photography. More specifically, in the case where the flash emission mode is flash-on mode or automatic mode, the flash control unit 73 turns on the flash 24 to flash at the time of photography if a preliminary image that will be described later does not have a predetermined lightness. In the case where the flash emission mode is flash-off mode, the flash control unit 73 prohibits light emission from the flash 24 at the time of photography.

The flash control unit 73 also determines an amount of light emitted from the flash 24 based on a position of focus found by the AF processing unit 62 so that the amount of light increases more as distance to the position of focus becomes longer. This amount is referred to as a first amount of light. In the case where photography is carried out by use of the flash 24, if a preliminary image obtained by preliminary photography includes a face, the amount of light emitted from the flash 24 is set to a second amount of light that is smaller than the first amount. The amount is reduced so as not to cause white compression on the face, and an amount of the reduction is found experimentally.

An image input controller 61 writes the CCD-RAW data input from the analog signal processing unit 60 in a frame memory 66.

The frame memory 66 is a memory used as workspace for various kinds of digital image processing (signal processing) on the image data that will be described later, and comprises an SDRAM (Synchronous Dynamic Random Access Memory) that carries out data transfer in synchronization with a bus clock signal of a predetermined period, for example.

A display control unit 71 is used for displaying the image data stored in the frame memory 66 as a through image on the LCD monitor 18, and for displaying image data stored in the external recording medium 70 on the LCD monitor 18 in the playback mode. The through image is photographed by the CCD 58 at predetermined intervals when the photography mode is on.

The AF processing unit 62 and the AE/AWB processing unit 63 determine a photography condition based on the preliminary image. The preliminary image is an image represented by the image data stored in the frame memory 66 as a result of preliminary photography carried out by the CCD 58 instructed by the CPU 75 that has detected a half-press signal generated by half press of the release button 19.

The AE processing unit 62 detects the position of focus based on the preliminary image, and outputs the focus drive data (AF processing). As a method of detecting the position of focus is adopted a passive method using a characteristic that contrast becomes higher in accurate focus.

The AE/AWB processing unit 63 measures luminance of the subject based on the preliminary image, and determines an iris value, a shutter speed, and the like based on the luminance. The AE/AWB processing unit then determines data of the iris value and the shutter speed as exposure setting values (AE processing), and automatically adjusts white balance at the time of photography (AWB processing). A user of the digital camera 1 can manually set the exposure and the white balance in the case where the photography mode is the manual mode. In the case where the exposure and the white balance have been set automatically, the user can manually adjust the exposure and the white balance by instructing the digital camera 1 while using the operational system such as the menu/OK button 12.

An image processing unit 64 carries out image quality enhancement processing such as Gamma correction, sharpness correction, and contrast correction on data of an actual image. The image processing unit 64 also carries out YC processing for converting the CCD-RAW data into YC data comprising Y data as a luminance signal, Cb data as a blue color difference signal, and Cr data as a red color difference signal. The actual image is input from the CCD 58 at the time of actual photography carried out by fully pressing the release button 19, and is represented by the image data stored in the frame memory 66 via the analog signal processing unit 60 and the image input controller 61. The maximum number of pixels of the actual image is determined by the number of pixels of the CCD 58. However, the number of pixels to be recorded can be changed by setting to fine or normal quality, for example. The number of pixels of the through image and the preliminary image is smaller than that of the actual image, and is 1/16 of the actual image, for example.

The image processing unit 64 finds the luminance of a face region in the actual image in the case where the amount of light emitted from the flash 24 has been set smaller than in ordinary photography, and adjusts the luminance of the face region to a predetermined threshold value Th1 in the case where the luminance is smaller than the threshold value Th1.

A compression/decompression unit 65 carries out compression processing in a format such as JPEG on the data of the actual image having been subjected to the correction and the conversion by the image processing unit 64, and generates the image file. A tag storing accompanying information such as the date and time of photography is added to the image file according to the Exif format or the like. The compression/decompression unit 65 also reads a compressed image file from the external recording medium 70 in the playback mode, and carries out decompression processing thereon. Image data after the decompression are output to the LCD monitor 18.

A media control unit 67 accesses the external recording medium 70, and controls image file reading and recording.

An internal memory 68 stores various kinds of constants set for the digital camera 1, and a program executed by the CPU 75, for example.

A face detection unit 80 detects a human face from the preliminary image and the actual image. More specifically, the face detection unit 80 detects as the face region a region having characteristics of face (such as presence of skin color, eyes, and face shape), which is not necessarily limited to this method.

The CPU 75 controls each of the units of the digital camera 1 in response to the signals from the operational system such as the operation mode switch 11 and the various processing units such as the AF processing unit 62.

A data bus 76 is connected to the image input controller 61, the various kinds of processing units 62 to 65, the frame memory 66, the media control unit 67, the internal memory 68, the display control unit 71, the face detection unit 80, and the CPU 75 for exchanging the digital image data and the like.

Figure 4:
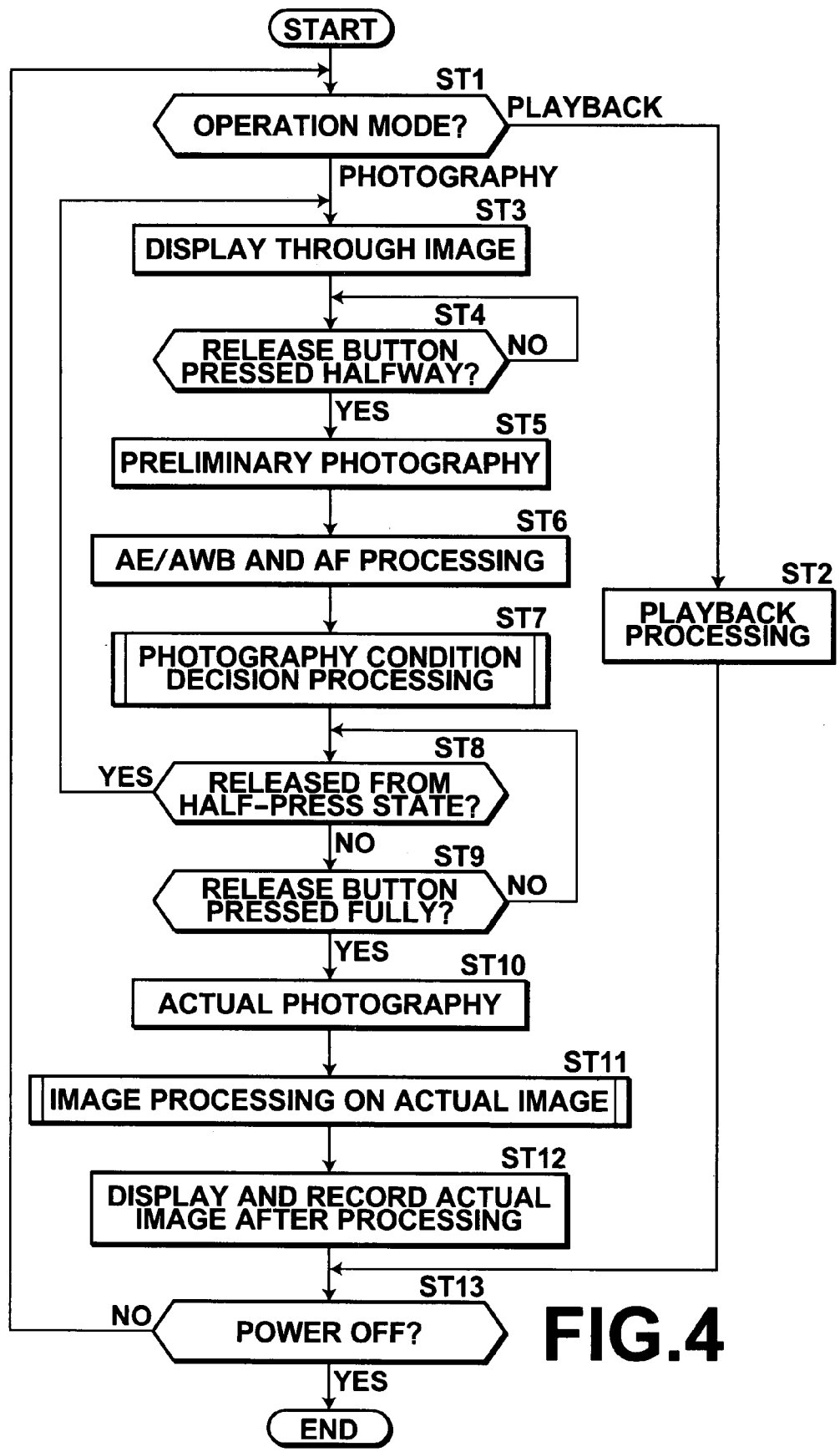
FIG. 4 is a flow chart showing procedures carried out in the first embodiment.

Next are described procedures carried out in the digital camera 1 of the above configuration at the time of photography. FIG. 4 is a flow chart showing the procedures carried out in the first embodiment.

The CPU 75 firstly judges the operation mode of the digital camera 1 (Step ST1). If the operation mode is the playback mode, playback processing is carried out wherein the image data stored in the external recording medium 70 are displayed on the LCD monitor 18 (Step ST2), and the flow of processing goes to Step ST13 that will be described later.

In the case of the photography mode, the CPU 75 displays the through image on the LCD monitor 18 (Step ST3), and starts monitoring as to whether the release button 19 is pressed halfway (Step ST4). If a result at Step ST4 is affirmative, the preliminary image is obtained by preliminary photography (Step ST5), and the AE/AWB processing unit 63 and the AF processing unit 62 respectively carry out the AE/AWB processing and the AF processing based on the preliminary image (Step ST6). The flash control unit 73 then carries out photography condition decision processing (Step ST7).

Figure 5:
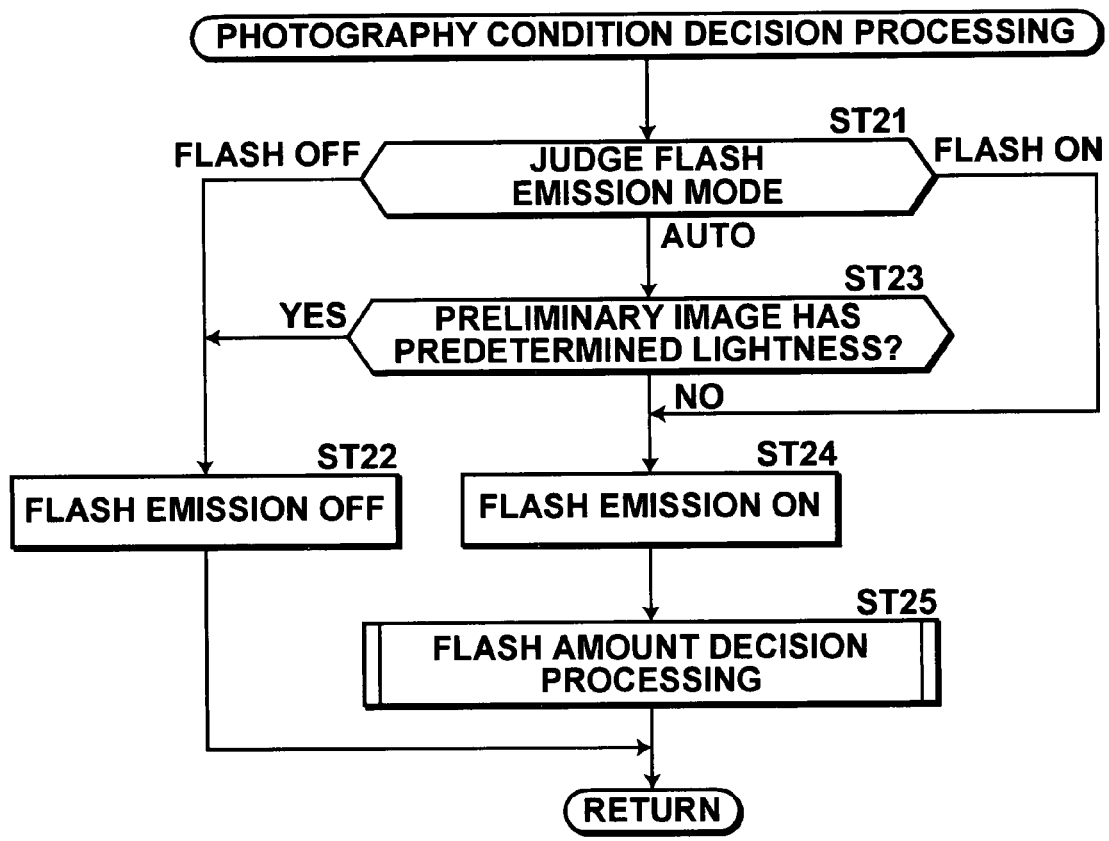
FIG. 5 is a flow chart showing photography condition decision processing.

FIG. 5 is a flow chart showing the photography condition decision processing. The flash control unit 73 firstly judges the flash emission mode (Step ST21). If the flash emission mode is flash-off mode, flash emission from the flash 24 is set to be off (Step ST22), and the flow of processing returns to the flow of processing in FIG. 4. In the case where the flash emission mode is automatic mode, judgment is made as to whether the preliminary image has the predetermined lightness (Step ST23). If a result at Step ST23 is affirmative, the flow of processing goes to Step ST22 whereat flash emission from the flash 24 is set to be off. If the result at Step ST23 is negative, flash emission from the flash 24 is set to be on (Step ST24), and flash emission decision processing is carried out (Step ST25). The flow of processing then returns to the flow of processing in FIG. 4. In the case where the flash emission mode is on, the flow of processing goes to Step ST24 whereat flash emission is set to be on. The flash amount decision processing is then carried out (Step ST25), and the flow of processing returns to the flow of processing in FIG. 4.

Figure 6:
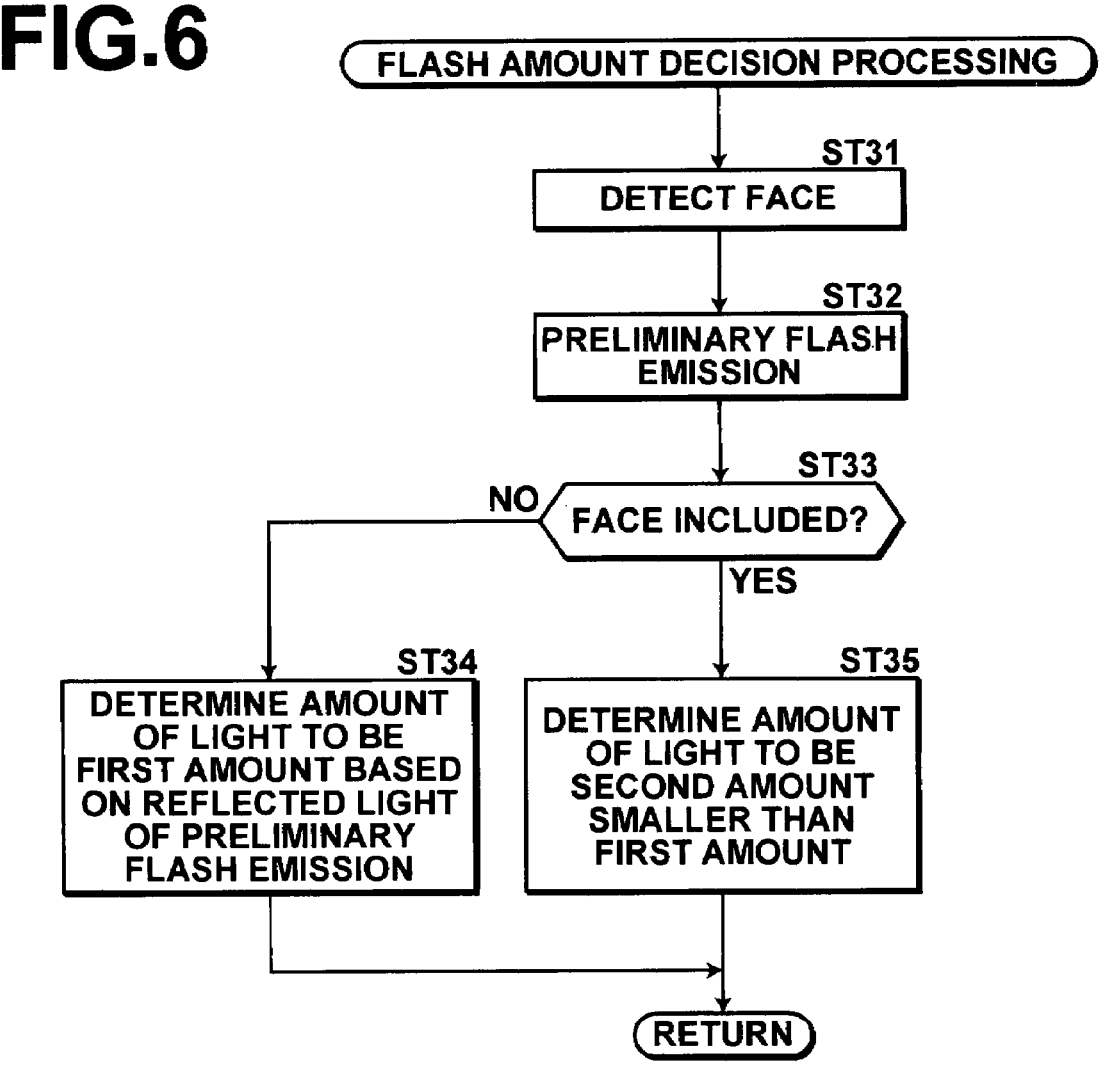
FIG. 6 is a flow chart showing flash amount decision processing.

FIG. 6 is a flow chart showing the flash amount decision processing. The face detection unit 80 firstly detects a face in the preliminary image (Step ST31), and the flash control unit 73 causes the flash 24 to carry out preliminary flash emission (Step ST32). The face detection unit 80 then judges whether a face is included in the preliminary image (Step ST33). If a result at Step ST33 is negative, the flash control unit 73 determines the amount of light emitted from the flash 24 based on light of the preliminary flash emission reflected by the subject (Step ST34), and the flow of processing returns to the flow of processing in FIG. 5. The amount of light determined at this time is the first amount of light.

If the result at Step ST33 is affirmative, the amount of light is determined to be the second amount of light that is smaller than the first amount (Step ST35), and the flow of processing returns to the flow of processing in FIG. 5. In the first embodiment, a table defining a relationship between the first and second amounts and the position of focus is stored in the internal memory 68, and the first and second amounts are determined according to the table.

After Step ST7 in FIG. 4, the CPU 75 judges whether the release button 19 has been released from the half-press state (Step ST8). If a result at Step ST8 is affirmative, the flow of processing returns to Step ST3, and the procedures from Step ST3 are repeated. If the result at Step ST8 is negative, whether the release button 19 has been fully pressed is then judged (Step ST9). If a result at Step ST9 is negative, the flow of processing returns to Step ST8.

If the result at Step ST9 is affirmative, photography of the actual image (actual photography) is carried out (Step ST10), and the image processing is carried out on the actual image obtained through the actual photography (Step ST11).

Figure 7:
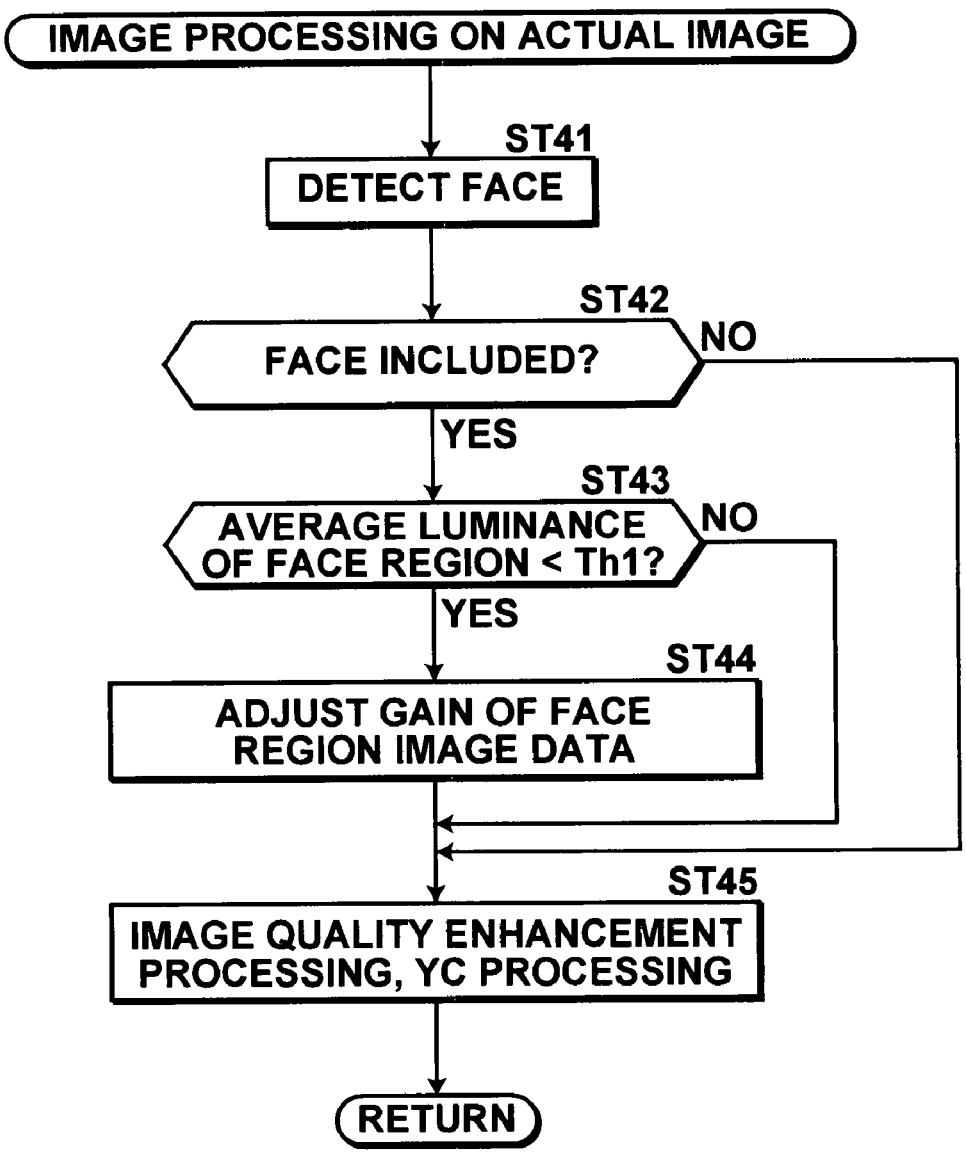
FIG. 7 is a flow chart showing image processing on a actual image.

FIG. 7 is a flow chart showing the image processing on the actual image. The face detection unit 80 firstly carries out face detection on the actual image (Step ST41), and judges whether a face is included in the actual image (Step ST42). If a result at Step ST42 is affirmative, the image processing unit 64 judges whether an average of the luminance of the face region in the actual image is under the predetermined threshold value Th1 (Step ST43). If a result at Step ST43 is affirmative, a gain of the image data corresponding to the face region is adjusted so that the average luminance of the face region in the actual image becomes the threshold value Th1 (Step ST44). In addition, the image quality enhancement processing and the YC processing are carried out on the actual image having the adjusted gain of the face region (Step ST45). The flow of processing then returns to the flow of processing in FIG. 4.

At Step ST44, gradation of the face region or the entire actual image may be adjusted instead of adjustment of the gain of the image data corresponding to the face region so that the average luminance of the face region in the actual image becomes the threshold value Th1. Furthermore, adjustment of the gain of the image data corresponding to the face region may be carried out together with adjustment of the gradation of the face region or the entire actual image.

If the result at Step ST42 is negative and if the result at Step ST43 is negative, the flow of processing goes to Step ST45 whereat only the image quality enhancement processing and the YC processing are carried out on the actual image. The flow of processing then returns to the flow of processing in FIG. 4.

At Step ST11 in FIG. 4, the actual image having been subjected to the processing is displayed on the LCD monitor 18 and recorded in the external recording medium 70 (Step ST12). Whether the power has been switched off is then judged (Step ST13). If a result at Step ST13 is negative, the flow of processing returns to Step ST1 and the procedures from Step ST1 are repeated. If the result at Step ST13 is affirmative, the flow of processing ends.

As has been described above, in the first embodiment, in the case where a human face has been detected in the preliminary image, the amount of light emitted from the flash 24 is reduced for photography of the actual image. In addition, the average luminance of the face in the actual image is adjusted to become the predetermined threshold value Th1. By reducing the amount of light emitted from the flash 24, white compression can be prevented from occurring in the face in the actual image. Although the face in the actual image becomes dark due to the reduction in flash emission from the flash 24, the face in the actual image can be prevented from appearing dark by adjustment of the luminance and/or gradation of the face in the actual image.

A second embodiment of the present invention is described next. In the second embodiment, the configuration of the digital camera 1 is the same as in the first embodiment. Therefore, detailed description thereof is omitted. In the first embodiment, the amount of light emitted from the flash 24 is reduced in the case where a human face is included in the preliminary image. In the second embodiment, the CCD control unit 59 reduces the gain of the CCD 58 in the case where a human face is included in the preliminary image.

For this reason, in the case where photography is carried out by use of the flash 24, if the preliminary image obtained through preliminary photography includes a face in the second embodiment, the CCD control unit 59 determines the gain of the CCD 58 to be a second gain that is smaller than a gain of ordinary photography (referred to as a first gain). The ordinary photography refers to photography through which an image including no face is obtained with or without use of the flash. The gain is reduced to the extent where white compression does not occur in the face, and an amount of the reduction is found experimentally.

In the second embodiment, the first and second gains are stored in the internal memory 68, and the gain of the CCD 58 is determined by reading either the first or the second gain according to inclusion or no inclusion of a face in the preliminary image.

The second embodiment is different from the first embodiment only in that the flash amount decision processing in the photography condition decision processing in the first embodiment is replaced by CCD gain decision processing, and the remaining procedures are the same as in the first embodiment. Therefore, only the CCD gain decision processing is described below.

Figure 8:
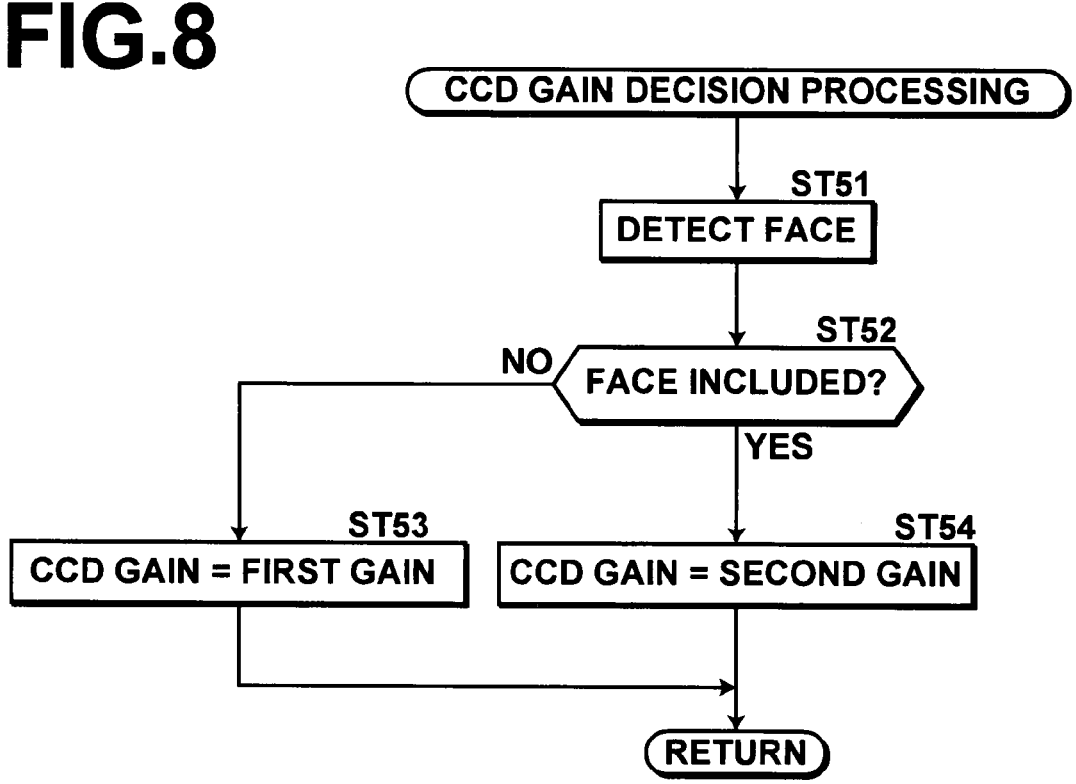
FIG. 8 is a flow chart showing CCD gain decision processing in a second embodiment of the present invention.

FIG. 8 is a flow chart showing the CCD gain decision processing. The face detection unit 80 carries out face region detection in the preliminary image (Step ST51), and judges whether a face is included in the preliminary image (Step ST52). If a result at Step ST52 is negative, the CCD control unit 59 determines the gain of the CCD 58 to be the first gain (Step ST53), and the flow of processing returns to the flow of processing in FIG. 4.

If the result at Step ST52 is affirmative, the CCD control unit 59 determines the gain of the CCD 58 to be the second gain that is smaller than the first gain (Step ST54), and the flow of processing returns to the flow of processing in FIG. 4.

As has been described above, in the case where a face has been detected in the preliminary image in the second embodiment, the gain of the CCD 58 is decreased for actual photography, and the luminance of the face in the actual image is adjusted. By reducing the gain of the CCD 58, white compression can be prevented from occurring in the face in the actual image. Although the face in the actual image becomes dark due to the decrease in the gain of the CCD 58, the face in the actual image can be prevented from appearing dark by adjustment of the luminance of the face.

In the embodiments describe above, the predetermined subject is a human face. However, the predetermined subject is not necessarily limited to human face, and other subjects can be used.

Although the digital camera related to the embodiments of the present invention has been described above, a program that causes a computer to function as means corresponding to the image processing unit 64, the flash control unit 73, the CCD control unit 59, and the face detection unit 80 for carrying out the processing shown in FIGS. 4 to 8 is also an embodiment of the present invention. In addition, a computer-readable recording medium storing the program is also an embodiment of the present invention.

What is claimed is:

1. A photography apparatus comprising:
   photography means for obtaining an image representing a subject by photographing the subject, the photography means comprising imaging means for imaging the subject;
   illumination means for emitting an auxiliary light to the subject at the time of photography of the subject;
   processing control means for obtaining an actual image by carrying out actual photography of the subject with the photography means while reducing an amount of the auxiliary light in the case where a predetermined target has been detected in a preliminary image obtained by causing the photography means to carry out preliminary photography; and
   image processing means for adjusting luminance and/or gradation of a region of the predetermined target in the actual image.

2. A photography apparatus comprising:
   photography means for obtaining an image representing a subject by photographing the subject, the photography means comprising imaging means for imaging the subject;
   illumination means for emitting an auxiliary light to the subject at the time of photography of the subject;
   processing control means for obtaining an actual image by carrying out actual photography of the subject with the photography means while lowering a gain of the imaging means in the case where a predetermined target has been detected in a preliminary image obtained by causing the photography means to carry out preliminary photography; and
   image processing means for adjusting luminance and/or gradation of a region of the predetermined target in the actual image.

3. The photography apparatus according to claim 1 wherein the predetermined target is a human face.

4. The photography apparatus according to claim 2 wherein the predetermined target is a human face.

5. A photography method for a photography apparatus comprising:
   photography means for obtaining an image representing a subject by photographing the subject, the photography means comprising imaging means for imaging the subject; and
   illumination means for emitting an auxiliary light to the subject at the time of photography of the subject, the photography method comprising the steps of:
   detecting a predetermined target in a preliminary image obtained by causing the photography means to carry out preliminary photography;
   obtaining an actual image by carrying out actual photography of the subject with the photography means while reducing an amount of the auxiliary light in the case where the predetermined target has been detected in the preliminary image; and adjusting luminance and/or gradation of a region of the predetermined target in the actual image.

6. A photography method for a photography apparatus comprising:

photography means for obtaining an image representing a subject by photographing the subject, the photography means comprising imaging means for imaging the subject; and illumination means for emitting an auxiliary light to the subject at the time of photography of the subject, the photography method comprising the steps of:

detecting a predetermined target in a preliminary image obtained by causing the photography means to carry out preliminary photography;

obtaining an actual image by carrying out actual photography of the subject with the photography means while lowering a gain of the imaging means in the case where the predetermined target has been detected in the preliminary image; and adjusting luminance and/or gradation of a region of the predetermined target in the actual image.

7. A non-transitory computer-readable medium, storing a set of instructions, executed by a processor, for causing a computer to execute a photography method in a photography apparatus comprising:

photography means for obtaining an image representing a subject by photographing the subject, the photography means comprising imaging means for imaging the subject; and illumination means for emitting an auxiliary light to the subject at the time of photography of the subject, the program comprising the procedures of:

detecting a predetermined target in a preliminary image obtained by causing the photography means to carry out preliminary photography;

obtaining an actual image by carrying out actual photography of the subject with the photography means while reducing an amount of the auxiliary light in the case where the predetermined target has been detected in the preliminary image;

adjusting luminance and/or gradation of a region of the predetermined target in the actual image; and storing the actual image after adjusting luminance and/or gradation of the region in the predetermined target.

8. A non-transitory computer-readable medium, storing a set of instructions, executed by a processor, for causing a computer to execute a photography method in a photography apparatus comprising:

photography means for obtaining an image representing a subject by photographing the subject, the photography means comprising imaging means for imaging the subject; and illumination means for emitting an auxiliary light to the subject at the time of photography of the subject, the program comprising the procedures of:

detecting a predetermined target in a preliminary image obtained by causing the photography means to carry out preliminary photography;

obtaining an actual image by carrying out actual photography of the subject with the photography means while lowering a gain of the imaging means in the case where the predetermined target has been detected in the preliminary image;

adjusting luminance and/or gradation of a region of the predetermined target in the actual image; and storing the actual image after adjusting the luminance and/or gradation of the region of the predetermined target.

* * * * *